(12) United States Patent
Tu

(10) Patent No.: US 10,272,610 B2
(45) Date of Patent: Apr. 30, 2019

(54) METHOD OF MANUFACTURING SIDEWALLS FOR A PORTABLE RESTROOM

(71) Applicant: Yueh Er Tu, Taoyuan (TW)

(72) Inventor: Yueh Er Tu, Taoyuan (TW)

( * ) Notice: Subject to any disclaimer, the term of this patent is extended or adjusted under 35 U.S.C. 154(b) by 221 days.

(21) Appl. No.: 15/294,725

(22) Filed: Oct. 15, 2016

(65) Prior Publication Data

US 2018/0104884 A1    Apr. 19, 2018

(51) Int. Cl.
| | |
|---|---|
| *B29D 7/00* | (2006.01) |
| *B29C 49/02* | (2006.01) |
| *B29C 69/00* | (2006.01) |
| *E04H 1/12* | (2006.01) |
| *B29K 105/00* | (2006.01) |
| *B29L 31/10* | (2006.01) |

(52) U.S. Cl.
CPC ............ *B29C 49/02* (2013.01); *B29C 69/001* (2013.01); *E04H 1/1216* (2013.01); *B29K 2105/0067* (2013.01); *B29L 2031/10* (2013.01)

(58) Field of Classification Search
CPC ....... B29C 49/02; B29C 49/00; B29C 29/001; E04H 1/1216; B29K 2105/0067; B29L 2031/10
See application file for complete search history.

(56) References Cited

U.S. PATENT DOCUMENTS

| | | | |
|---|---|---|---|
| 2005/0029267 A1* | 2/2005 | Martin | B65D 17/506 220/270 |
| 2011/0000011 A1* | 1/2011 | Gebka | G09F 15/00 4/321 |

* cited by examiner

*Primary Examiner* — Kelly M Gambetta

(57) ABSTRACT

A formation device melts a plastic material and places the melted plastic material into a mold. The mold has an upper case, a lower case and a cavity, and a blowing aperture is disposed at a conjunction area of the upper and lower cases and extending to the cavity. The formation device utilizes a blowing tube to connect to the blowing aperture to reach into the plastic material in the cavity. During a blow molding process, the formation device inflates the plastic material through the blowing tube such that the plastic material expands to conform with a shape of the cavity, and when the mold is opened, a hollow casing member is obtained. The casing member further comprises a framed base, and two opposite sides of the base respectively connected to a top board and a bottom board via a connecting lip.

9 Claims, 9 Drawing Sheets

METHOD OF MANUFACTURING SIDEWALLS FOR A PORTABLE RESTROOM

BACKGROUND OF THE INVENTION

1. Field of the Invention

The present invention relates to a method of manufacturing sidewalls for a portable restroom, and more particularly to a method of manufacturing light-weight sidewalls for a portable restroom with high production performance.

2. Description of the Related Art

Currently, a conventional sidewalls for a portable restroom utilizes a blowing formation step including: a formation device melting a plastic material and placing the melted plastic material into a mold; the mold comprising an upper case, a lower case and at least one cavity, a blowing aperture disposed at a conjunction area of the upper and lower cases and extending to the cavity; the formation device utilizing a blowing tube to connect to the blowing aperture; wherein during a blow molding process, the formation device inflates the plastic material through the blowing tube such that the plastic material expands to conform with a shape of the cavity, and when the mold is opened, a hollow sidewall is obtained.

However, the above-mentioned method has following issues: first, each blowing process can only produce one sidewall. Second, the sidewall is an individual hollow casing member, therefore, each portable restroom requires three sidewalls.

Therefore, it is desirable to provide a method of manufacturing light-weight sidewalls for a portable restroom to mitigate and/or obviate the aforementioned problems.

SUMMARY OF THE INVENTION

An objective of the present invention is to provide a method of manufacturing light-weight sidewalls for a portable restroom with high production performance.

In order to achieve the above mentioned objective, a formation device melts a plastic material and places the melted plastic material into a mold. The mold comprises an upper case, a lower case and a cavity, and a blowing aperture is disposed at a conjunction area of the upper and lower cases and extending to the cavity. The formation device utilizes a blowing tube to connect to the blowing aperture to reach into the plastic material in the cavity. During a blow molding process, the formation device inflates the plastic material through the blowing tube such that the plastic material expands to conform with a shape of the cavity, and when the mold is opened, a hollow casing member is obtained. The casing member further comprises a framed base, and two opposite sides of the base respectively connected to a top board and a bottom board via a connecting lip. The connecting lip of the casing member has a relatively thinner thickness designed for a further cutting step, such that the top board and the bottom board of the casing member will be respectively provided with an the engaging flange on both sides.

With the above-mentioned manufacture method has following benefits: First, by combining the blowing step and the cutting step, two sidewalls of the portable restroom can be manufacture at the same time, which can increase production performance and decrease the cost. Second, the casing member is cut into two sidewalls, therefore the portable restroom has lighter weight. Third, the connecting lip is formed with a thinner thickness in the molding mold, and it is easy to cut off the sidewall at the connecting lip.

Other objects, advantages, and novel features of the invention will become more apparent from the following detailed description when taken in conjunction with the accompanying drawings.

DETAILED DESCRIPTION OF THE PREFERRED EMBODIMENT

Please refer to FIG. 1 to FIG. 7. According to the present invention, a method of manufacturing light-weight sidewalls for a portable restroom with high production performance, which comprises a blowing step and a cutting step.

Figure 1:
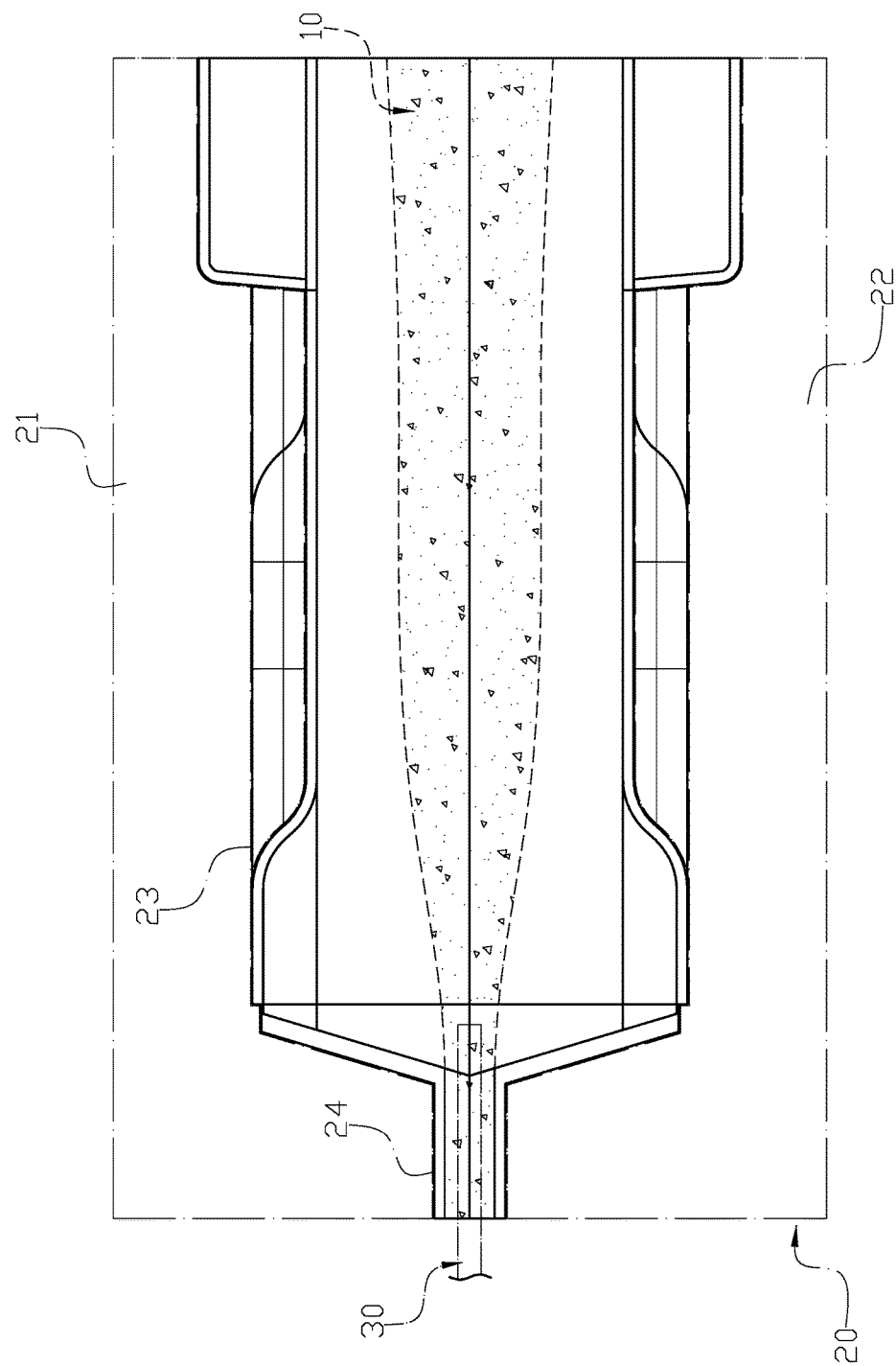
FIG. 1 is a schematic drawing of a blowing process according to a first embodiment of the present invention.
Figure 2:
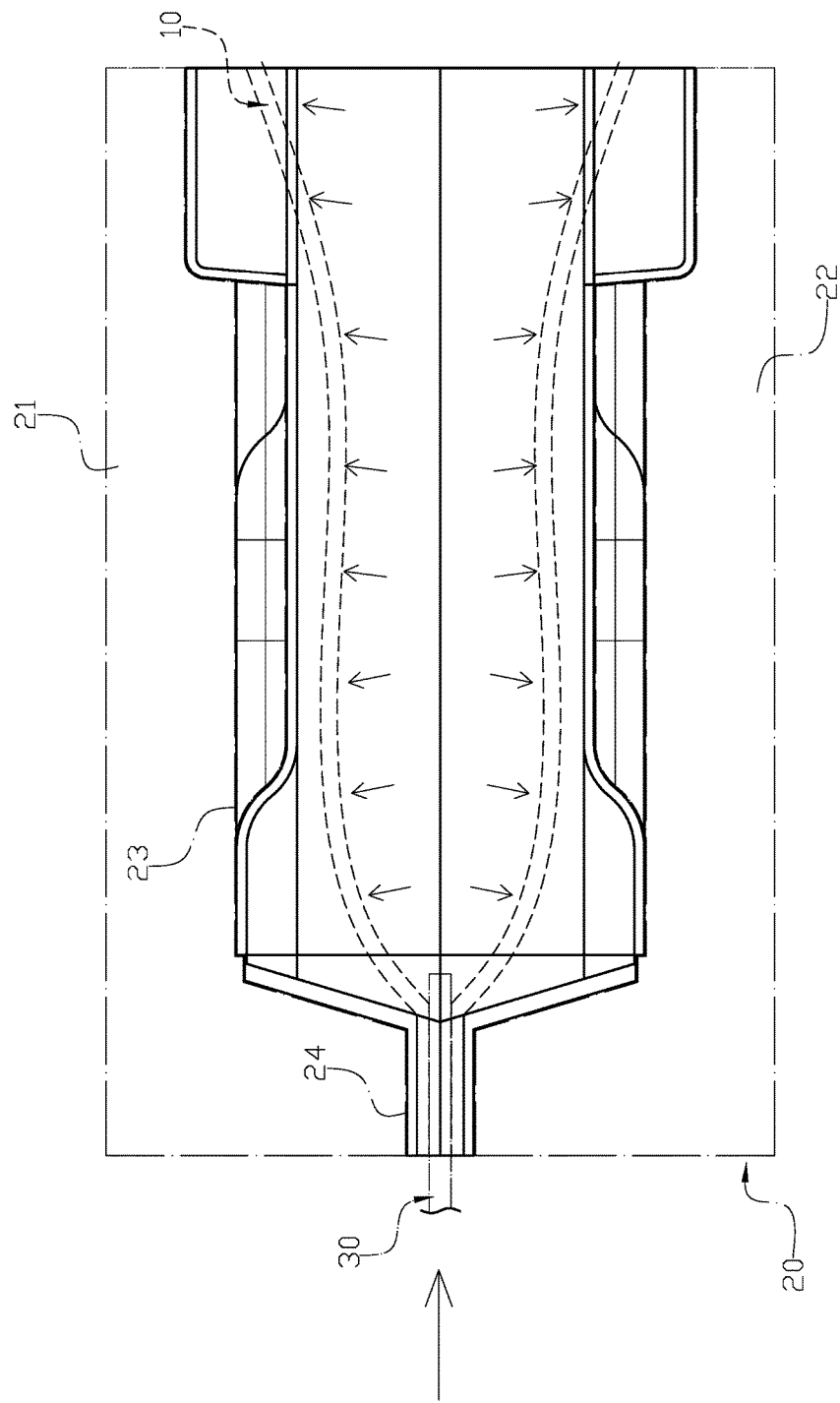
FIG. 2 is another schematic drawing of the blowing process according to the first embodiment of the present invention.
Figure 3:
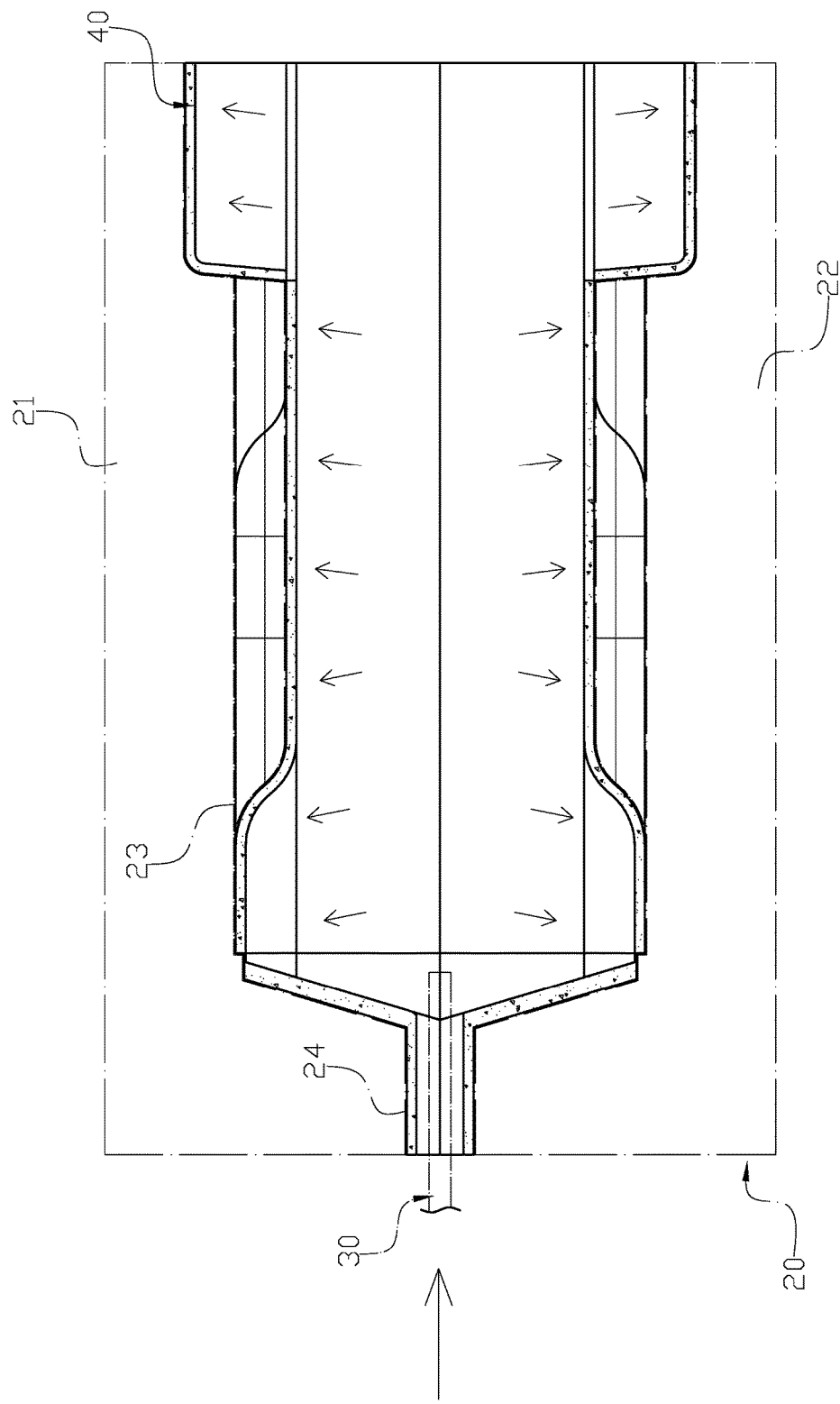
FIG. 3 is another schematic drawing of the blowing process according to the first embodiment of the present invention.
Figure 4:
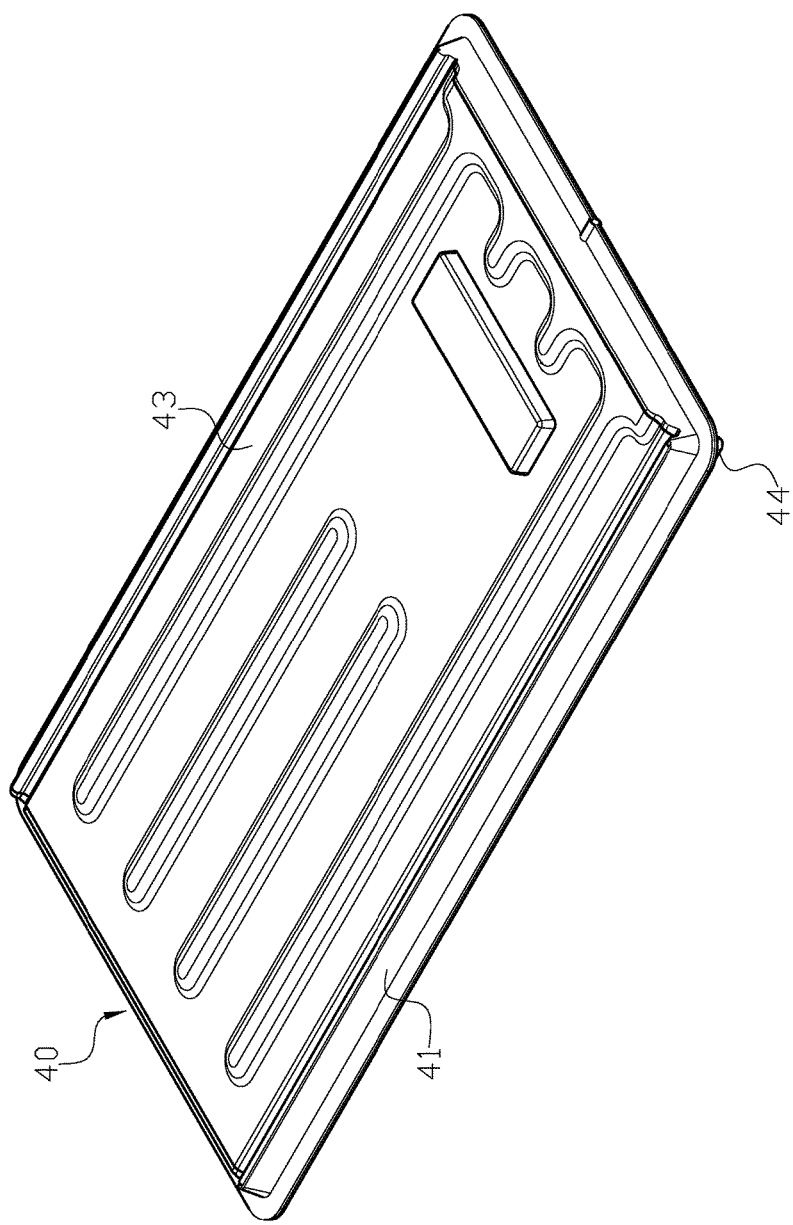
FIG. 4 is a schematic drawing of a finished casing member according to the first embodiment of the present invention.
Figure 5:
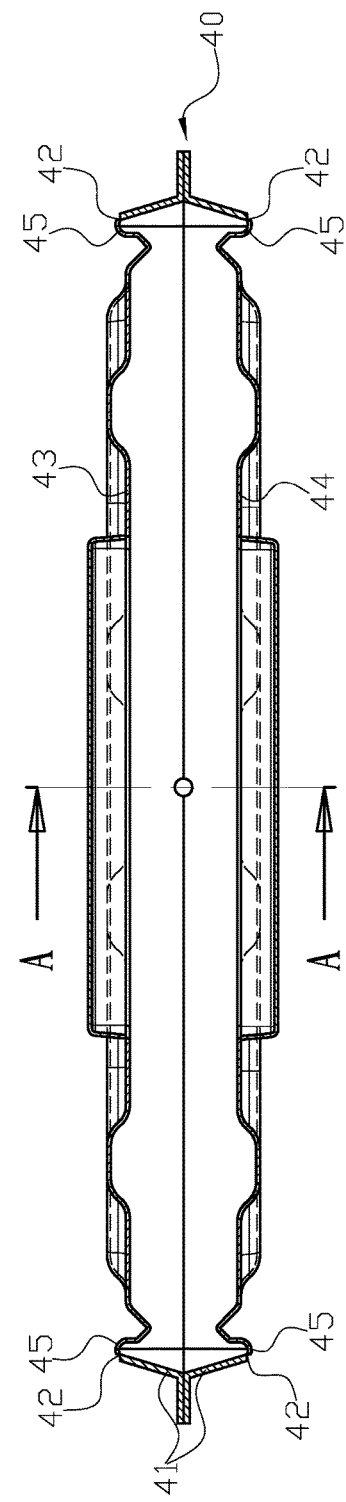
FIG. 5 is a cross-sectional drawing of the casing member according to the first embodiment of the present invention.

Please refer to FIG. 1 to FIG. 3 for the blowing step. A formation device melts a plastic material 10 and places the melted plastic material 10 into a mold 20. The mold 20 comprises an upper case 21, a lower case 22 and a cavity 23, and a blowing aperture 24 is disposed at a conjunction area of the upper and lower cases 21, 22 and extending to the cavity 23. The formation device utilizes a blowing tube 30 to connect to the blowing aperture 24 to reach into the plastic material 10 in the cavity 23. During a blow molding process, the formation device inflates the plastic material 10 through the blowing tube 30 such that the plastic material 10 expands to conform with a shape of the cavity 23, and when the mold 20 is opened, a hollow casing member 40 is obtained. As shown in FIG. 4 and FIG. 5, the casing member 40 further comprises a framed base 41, and two opposite sides of the base 40 respectively connected to a top board 43 and a bottom board 44 via a connecting lip 42. The connecting lip 42 of the casing member 40 has a relatively thinner thickness designed for a further cutting step, such that the top board 43 and the bottom board 44 of the casing member 40 will be respectively provided with an the engaging flange 45 on both sides.

Figure 6:
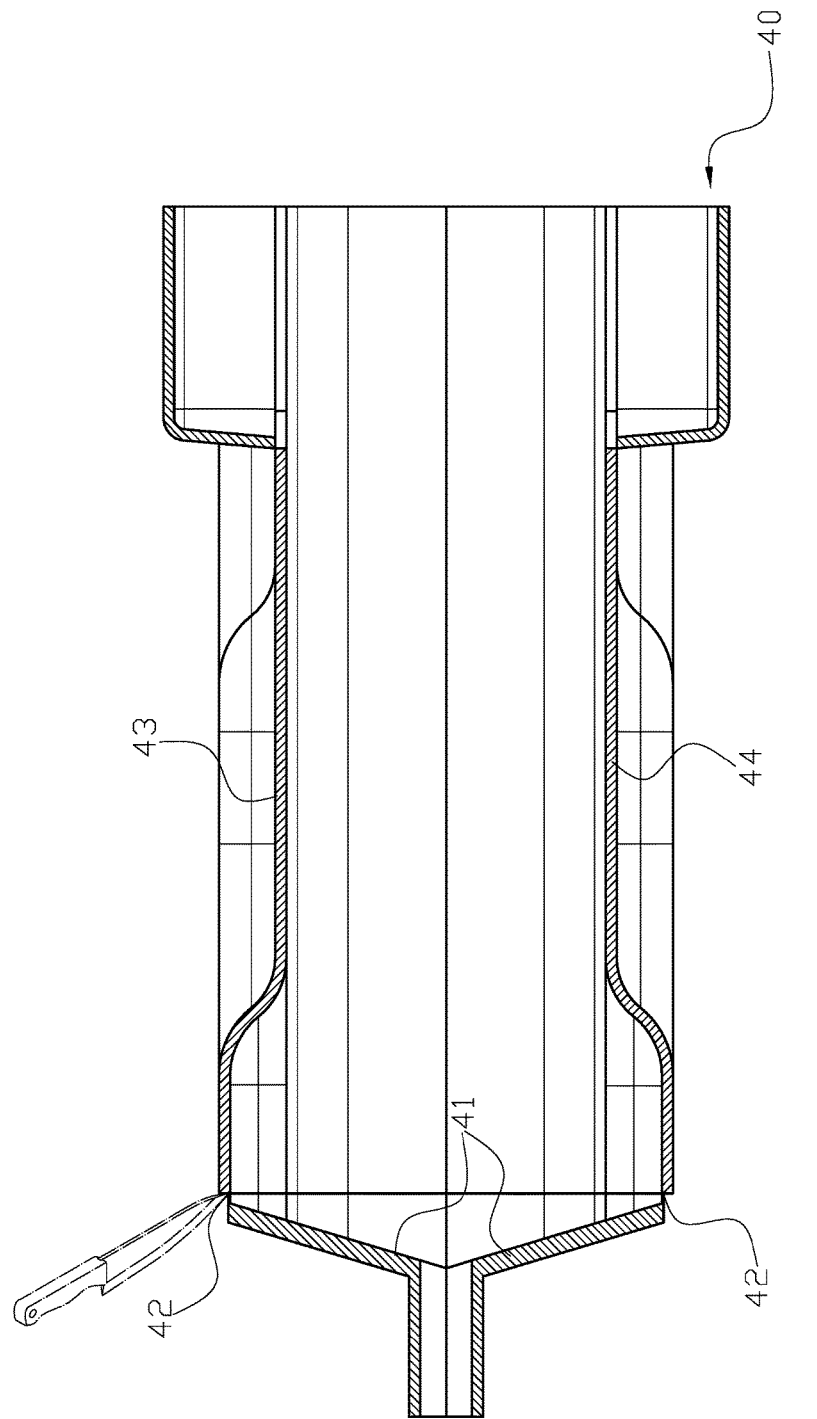
FIG. 6 is a cross-sectional drawing of along line A-A according to the first embodiment of the present invention.
Figure 7:
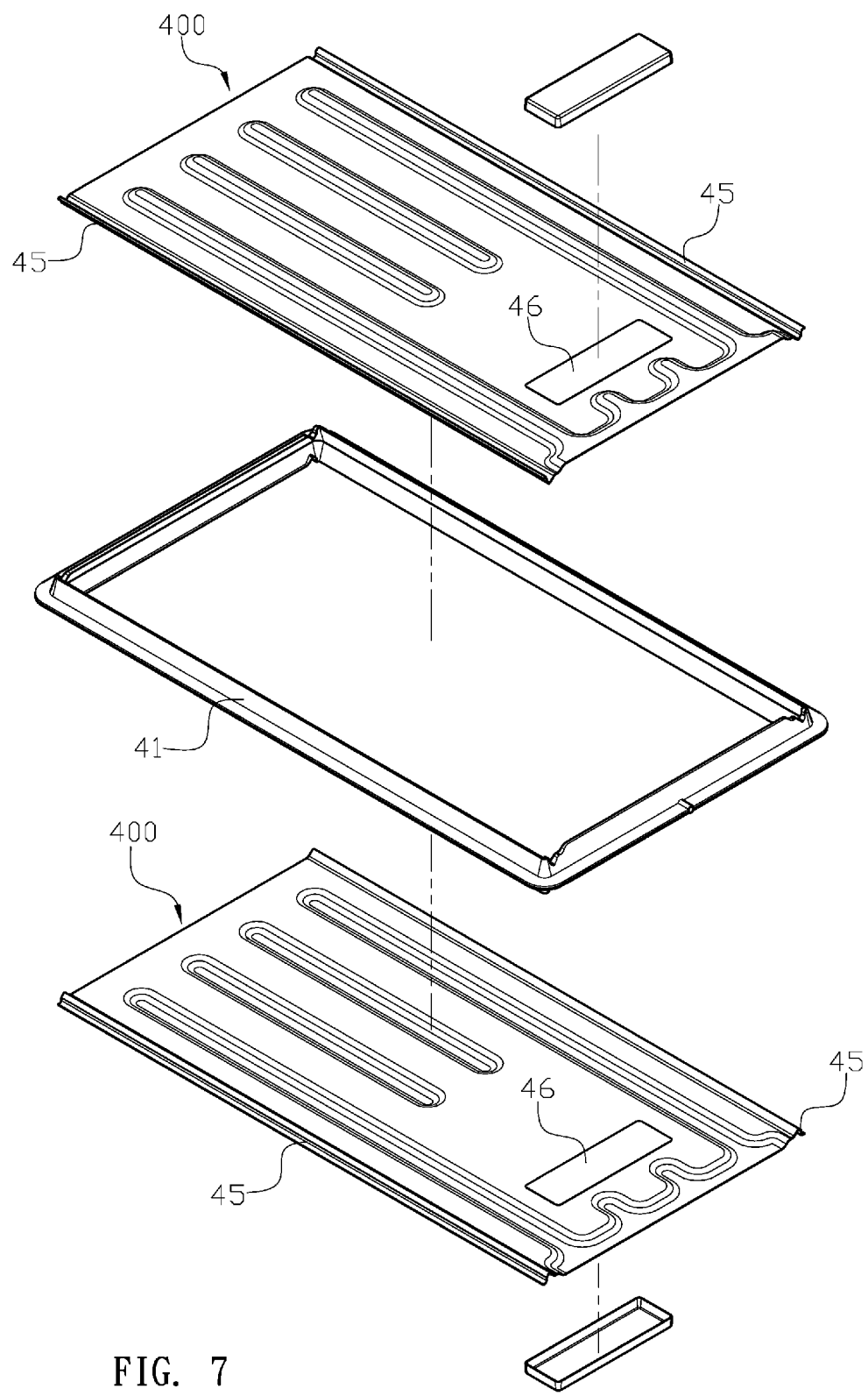
FIG. 7 is a schematic drawing after the cutting step according to the first embodiment of the present invention.

For the cutting step, please refer to FIG. 6 and FIG. 7. The top board 43 and the bottom board 44 of the casing member 40 are cut off from the connecting lip 42, such that the top board 43 and the bottom board 44 can be individually used as a sidewall 400 for a portable restroom. Furthermore, since the connecting lip 42 of the casing member 40 has a relatively thinner thickness due to a predetermined design of the molding mold 20, the cutting step could be easier and faster. The creation of the engaging flange 45 improve the installation of the sidewall 400 with the portable restroom.

The embodiment of the present invention provides a method of manufacturing sidewalls for a portable restroom, and the formation of the top board 43 and the bottom board 44 of the casing member 40 is executed manually or by a machine. In addition, the sidewall 400 further includes at least one venting aperture 46.

Figure 8:
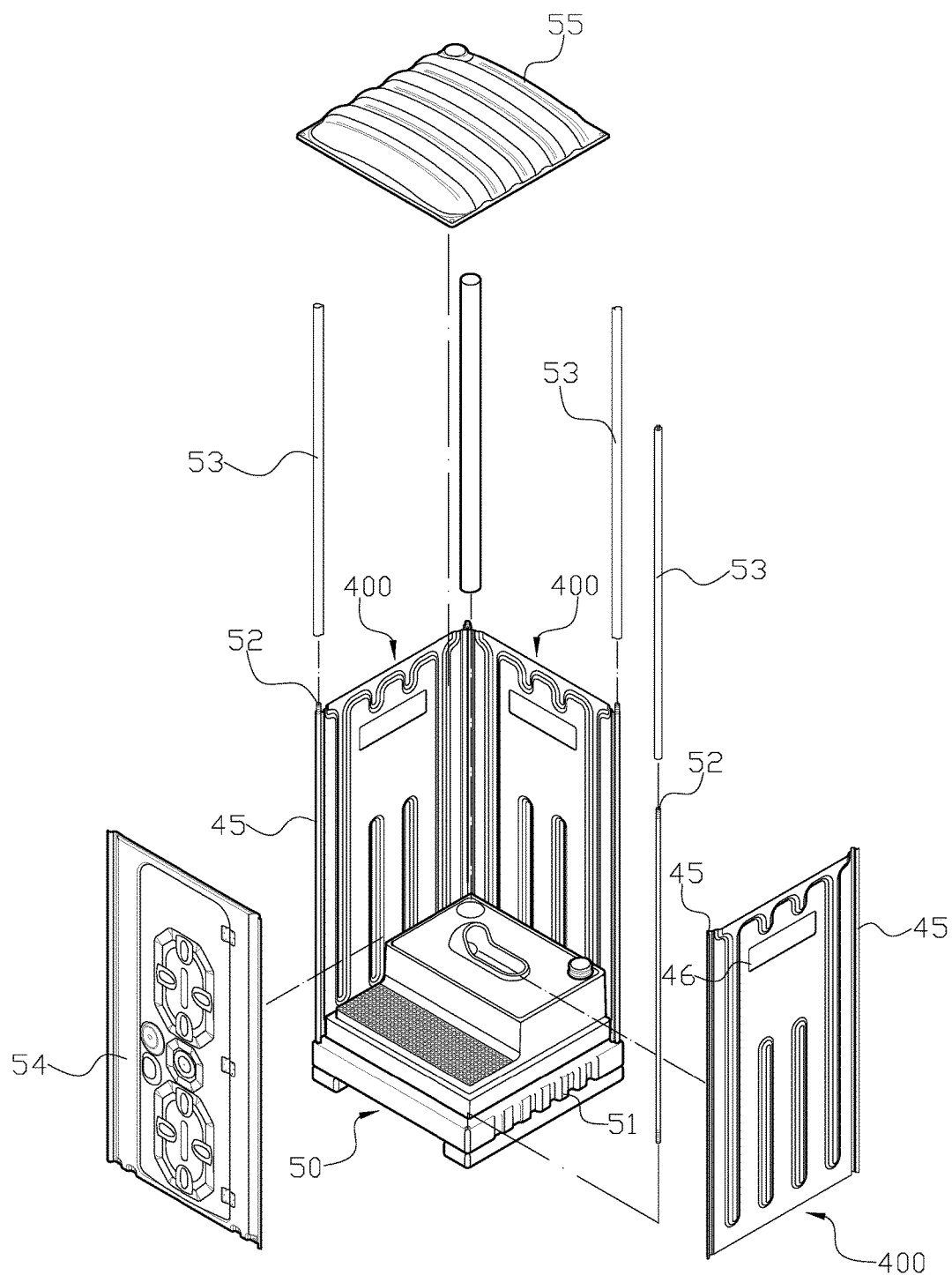
FIG. 8 is a schematic drawing showing the sidewalls installed on the portable restroom according to the first embodiment of the present invention.
Figure 9:
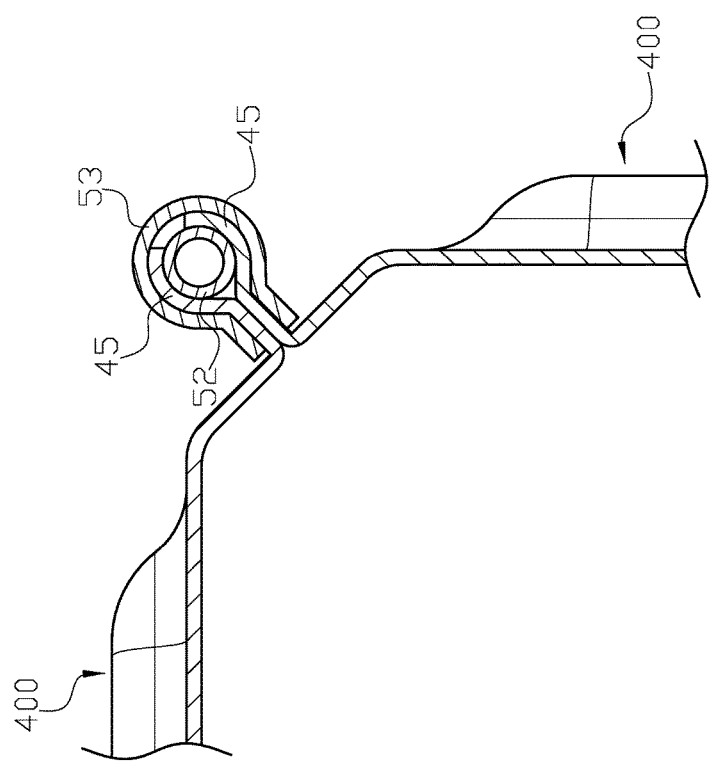
FIG. 9 is a cross-sectional drawing of the sidewall installed on the portable restroom according to the first embodiment of the present invention.

For actual installation, as shown in FIG. 8 and FIG. 9, a base 51 of the portable restroom 50 is installed with four securing rods 52 which allow the sidewalls 400 to be install at two sides and a rear side of the portable restroom 50, and the engaging flange 45 hooks with the securing rods 52. Furthermore, a cover tube 53 is jacketed onto the four securing rods 52, therefore, the engaging flange 45 of the sidewall 400 is sandwiched between the cover tube 53 and the securing rods 52. Finally, a door board 54 is installed to finish the portable restroom 50, and a top board 55 of the portable restroom 50 is also finished by the above-mention manufacture method.

With the above-mentioned manufacture method has following benefits: First, by combining the blowing step and the cutting step, two sidewalls 400 of the portable restroom can be manufacture at the same time, which can increase production performance and decrease the cost. Second, the casing member 40 is cut into two sidewalls 400, therefore the portable restroom 50 has lighter weight. Third, the connecting lip 42 is formed with a thinner thickness in the molding mold 20, and it is easy to cut off the sidewall 400 at the connecting lip 42.

Although the present invention has been explained in relation to its preferred embodiment, it is to be understood that many other possible modifications and variations can be made without departing from the spirit and scope of the invention as hereinafter claimed.

What is claimed is:

1. A method of manufacturing sidewalls for a portable restroom comprising a blowing formation step and a cutting step, wherein:
   the blowing formation step includes: a formation device melting a plastic material and placing the melted plastic material into a mold, the mold comprising an upper case, a lower case and at least one cavity, a blowing aperture disposed at a conjunction area of the upper and lower cases and extending to the cavity; the formation device utilizing a blowing tube to connect to the blowing aperture; wherein during a blow molding process, the formation device inflates the plastic material through the blowing tube such that the plastic material expands to conform with a shape of the cavity, and when the mold is opened, a hollow casing member is obtained, the casing member further comprising a framed base, two opposite sides of the base respectively connected to a top board and a bottom board via a connecting lip, the connecting lip of the casing member having a relatively thinner thickness for a further cutting step, such that the top board and the bottom board of the casing member are respectively provided with an the engaging flange on both sides; and
   the cutting step includes: cutting the top board and the bottom board of the casing member off the connecting lip;
   wherein the sidewall further includes at least one venting aperture.

2. The method of manufacturing sidewalls for a portable restroom as claimed in claim 1, wherein formation of the top board and the bottom board of the casing member is executed manually.

3. The method of manufacturing sidewalls for a portable restroom as claimed in claim 1, wherein formation of the top board and the bottom board of the casing member is executed by a machine.

4. A method of manufacturing sidewalls for a portable restroom comprising a blowing formation step and a cutting step, wherein:
   the blowing formation step includes: a formation device melting a plastic material and placing the melted plastic material into a mold, the mold comprising an upper case, a lower case and at least one cavity, a blowing aperture disposed at a conjunction area of the upper and lower cases and extending to the cavity; the formation device utilizing a blowing tube to connect to the blowing aperture; wherein during a blow molding process, the formation device inflates the plastic material through the blowing tube such that the plastic material expands to conform with a shape of the cavity, and when the mold is opened, a hollow casing member is obtained, the casing member further comprising a framed base, two opposite sides of the base respectively connected to a top board and a bottom board via a connecting lip, the connecting lip of the casing member having a relatively thinner thickness for a further cutting step, such that the top board and the bottom board of the casing member are respectively provided with an the engaging flange on both sides; and
   the cutting step includes: cutting the top board and the bottom board of the casing member off the connecting lip;
   wherein the sidewall is attached onto three adjacent sides of the portable restroom.

5. A method of manufacturing sidewalls for a portable restroom comprising a blowing formation step and a cutting step, wherein:
   the blowing formation step includes: a formation device melting a plastic material and placing the melted plastic material into a mold, the mold comprising an upper case, a lower case and at least one cavity, a blowing aperture disposed at a conjunction area of the upper and lower cases and extending to the cavity; the formation device utilizing a blowing tube to connect to the blowing aperture; wherein during a blow molding process, the formation device inflates the plastic material through the blowing tube such that the plastic material expands to conform with a shape of the cavity, and when the mold is opened, a hollow casing member is obtained, the casing member further comprising a framed base, two opposite sides of the base respectively connected to a top board and a bottom board via a connecting lip, the connecting lip of the casing member having a relatively thinner thickness for a further cutting step, such that the top board and the bottom board of the casing member are respectively provided with an the engaging flange on both sides; and
   the cutting step includes: cutting the top board and the bottom board of the casing member off the connecting lip;
   wherein the portable restroom further comprises a top board formed by the method of manufacturing sidewalls.

6. The method of manufacturing sidewalls for a portable restroom as claimed in claim 4, wherein formation of the top board and the bottom board of the casing member is executed manually.

7. The method of manufacturing sidewalls for a portable restroom as claimed in claim 4, wherein formation of the top board and the bottom board of the casing member is executed by a machine.

8. The method of manufacturing sidewalls for a portable restroom as claimed in claim 5, wherein formation of the top board and the bottom board of the casing member is executed manually.

9. The method of manufacturing sidewalls for a portable restroom as claimed in claim 5, wherein formation of the top board and the bottom board of the casing member is executed by a machine.

* * * * *